May 14, 1963 C. T. ZAVALES 3,090,010
DROOP COMPENSATING CIRCUIT FOR HARD TUBE MODULATOR SYSTEMS
Filed Sept. 29, 1961

INVENTOR.
CHARLES T. ZAVALES.

ATTORNEY.

3,090,010
Patented May 14, 1963

3,090,010
DROOP COMPENSATING CIRCUIT FOR HARD TUBE MODULATOR SYSTEMS
Charles T. Zavales, New York, N.Y., assignor to FXR., a Division of Amphenol-Borg Electronic Corp., Woodside, N.Y., a corporation of Delaware
Filed Sept. 29, 1961, Ser. No. 141,818
5 Claims. (Cl. 328—67)

The present invention relates to a droop compensating circuit for pulse generators as used to supply pulsed energy for modulators which energize magnetrons, amplifiers or klystrons, in radar systems and the like.

It is well known that in electrical discharge devices such as these "hard tube" magnetrons, amplifiers and klystrons, the electrical discharge current flowing through the device even during the infinitesimally short period of the pulse duration will decrease very rapidly as the voltage "droops" or falls off. Also, since the substantially instantaneous high power pulse of radio frequency energy is customarily supplied from an energy storage device forming a part of the supply system such energy must build up very rapidly to the required voltage and the current to thus supply the necessary radio frequency energy for the next succeeding pulse delivered to the modulator tube.

The primary object of the present invention is the provision of a droop compensating circuit for pulse generators wherein the effect of voltage loss in the energy storage device, during transmission of the high power pulse of radio frequency energy to the modulator tube load, is entirely cancelled out by complete compensation for such effect.

Such compensation is accomplished in accordance with the present invention by simultaneously charging the energy storage device with electrical energy of opposite sign during the actual discharge thereof to produce the high power pulse in the modulator tube load.

Figure 1:
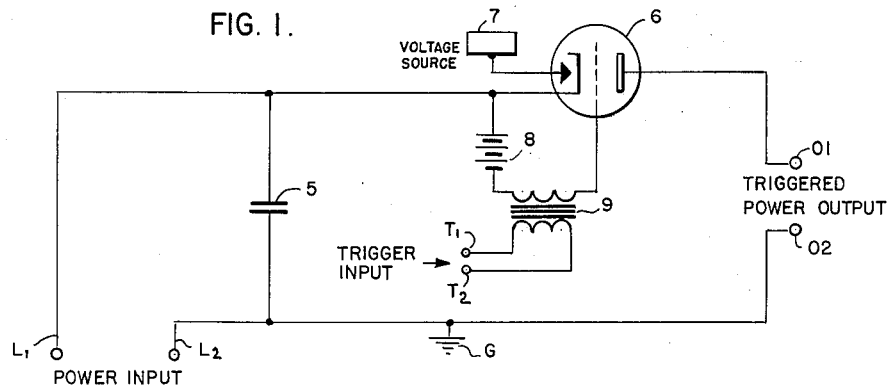
Figure 2:
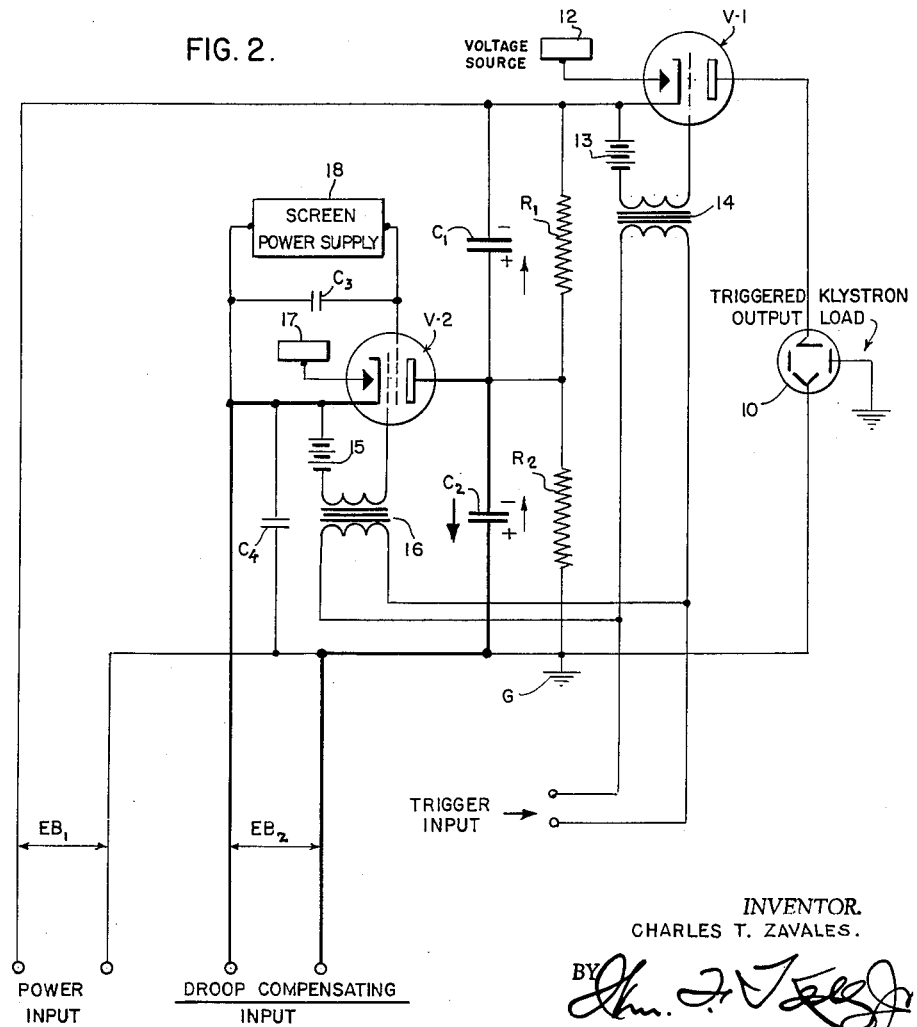

For a better understanding of the present invention reference may be had to the accompanying drawing wherein:

FIG. 1 is a schematic illustration of a conventional pulse generating system for a modulator tube or the like, and FIG. 2 is a schematic illustration of the droop compensating circuit for high power pulsed radio frequency energization of a modulator tube load in accordance with the present invention.

Referring now to the drawing in detail the "hard tube" modulator circuit as shown in FIG. 1 comprises a high power radio frequency power supply source, or "Power Input" L1, L2, which is connected directly to a capacitor 5 with one side thereof grounded at G. The discharge circuit or "triggered power output" O1, O2 from the capacitor 5 for energizing the customary magnetron, amplifier or klystron tube load includes a switching tube 6. This switching tube 6 has its cathode and anode connected to the capacitor 5 and load O1, O2 so that the load is energized whenever such switching tube becomes conductive. The thermionic cathode of the switching tube 6 receives heating energy from a low-voltage transformer 7 and a negative biasing voltage is normally applied to the grid of the switching tube 6 by a battery or the like 8 so as to make this switching tube non-conducting during charging of the capacitor 5.

When it is desired to make the switching tube 6 conductive, so as to cause the capacitor 5 to discharge and energize the load, a positive signal is fed to the control grid of the switching tube through an insulation pulse transformer 9 which has its primary winding connected to a "trigger input" source of supply T1, T2. Accordingly, for the duration of the pulse impressed upon the isolation transformer 9, the switching tube 6 is conductive with the result that the "triggered power output" O1, O2 which is connected to the usual electronic discharge tube, receives discharged energy from the capacitor 5 and immediately upon cessation of the "trigger input" to isolation transformer 9, the negative bias is again restored to the grid of the switching tube 6, returning it to its normal non-conducting state.

By connecting the energy storage capacitor 5 on the power supply side of the switching tube 6 as shown in FIG. 1, and eliminating the use of a charging diode as heretofore used in the art, the shunt capacitance effect of the energy storage capacitor 5 across the output terminals O1, O2 is eliminated. This absence of shunt capacitance effect in turn eliminates the "slow down" in the rate of rise and fall of the voltage across the output terminals which would otherwise necessitate the power supply furnishing additional power to charge the shunt capacitor 5. Moreover, in the circuit arrangement as shown in FIG. 1 the requirement for additional current from the power supply during the time that the switching tube 6 is conductive to energize the load is entirely obviated. Despite the foregoing advantages of FIG. 1 it inherently possesses the objection that during the energy pulse, when the switching tube 6 is conductive, the energy storage capacitor 5 is nevertheless subject to a loss of voltage or "droop," which heretofore has been reduced by increasing the size of capacitor 5 but this has practical limitations since the greater the decrease of "droop" the larger the capacitor.

In accordance with the present invention this "droop" or fall in voltage during the energy pulse to the load is entirely eliminated without the necessity of providing large capacity energy storage capacitors by the circuit arrangement as shown in FIG. 2. This "droop" compensated hard tube modulator system, as shown in this latter figure, comprises a "Power Input" of high power radio frequency energy $E_{B1}$ connected directly to a pair of serially connected capacitors C1 and C2 and grounded at G. A resistance divider assembly comprising resistors R1 and R2 is connected in shunt with capacitors C1 and C2 in order to insure proper voltage division between these series connected energy storage capacitors. Again as in FIG. 1, the pulsed discharge of high power radio frequency energy from the capacitors C1 and C2 is supplied to the triggered output klystron load 10 when a switching tube V1 becomes conductive as previously described relative to the switching tube 6 of FIG. 1, with the flow of current being in the direction indicated by the light arrows in FIG. 2.

This switching tube V1 also has its thermionic cathode supplied with low voltage heating energy from a transformer 12 and a negative biasing voltage is normally applied to the grid thereof by a battery 13 so as to render this switching tube V1 non-conducting during charging of the capacitors C1 and C2. Also upon the imposition of a positive signal through an isolation pulsed coupling transformer 14, which has its primary winding connected to a "triggered input" supply source, such switching tube V1 becomes conductive to cause discharge of capacitors C1 and C2 with attendant energization of the klystron load 10 as above mentioned. The circuitry of FIG. 2 thus far described differs very little from that previously described relative to FIG. 1. However, in order to compensate for the "droop" otherwise occurring in the voltage across the capacitors C1 and C2 an additional switching tube V2 is provided which operates simultaneously with switching tube V1. In other words, V2 is likewise normally non-conductive since a negative biasing voltage is supplied to its control grid by a battery 15 but becomes conductive simultaneously with V1 becoming conductive, because V2 receives a positive signal from an isolation coupling transformer 16 when its primary is energized from the same "trigger input" supply source as that of isolation transformer 14.

As shown in FIG. 2 the thermionic cathode of switching tube V2 receives heating energy from a low voltage heating transformer 17 and the screen grid of such tube is supplied from a "screen power supply" 18 having a smoothing capacitor C3 in shunt therewith. It will also be noted from FIG. 2 that capacitor C2 is arranged to be charged from a constant current "droop" compensating source comprising a "droop compensating input" source $E_{B2}$ and a shunt connected capacitor C4 which charges the capacitor C2 in a direction as shown by the heavy arrow in FIG. 2 and thus opposite to the flow of discharge current to the klystron load 10, as indicated by the previously mentioned light-lined arrows. Moreover, since both switching tubes V1 and V2 simultaneously become conductive, as previously described, during the instant of the pulse when the klystron load 10 is energized by the discharge current from the series connected capacitors C1 and C2, the capacitor C2 is being charged with compensating current which thus prevents the "droop" in voltage otherwise occurring in the klystron load circuit as the stored energy is dissipated by the capacitors.

It will also be noted that inasmuch as the capacitors C1 and C2 are of substantially equal value the "droop" in voltage of the klystron load circuit would be equally divided across these two capacitors and if only the voltage "droop" in capacitor C2 was compensated for by its simultaneous charging in an opposite direction, then complete compensation of the klystron load circuit is not achieved. Accordingly, to accomplish complete compensation in accordance with the present invention the two switching tubes V1 and V2 are simultaneously closed (made conductive) for the duration of the entire pulse period and by charging capacitor C2 from the constant current source $E_{B2}$ with a current twice the value of the klystron load current, the voltage "droop" across capacitor C1 is thus indirectly compensated for along with direct compensation of capacitor C2, so that the total voltage "droop" across the series connected capacitors C1 and C2 is zero resulting in complete compensation of the tube modulator circuit.

From the foregoing it should thus become obvious to those skilled in the art that a "droop" compensating system is provided by the present invention for hard tube modulator circuits which fully compensates for the loss of energy from the energy storage capacitor bank without the necessity for a capacitor of infinite size. By causing the addition of energy to at least one of the energy storage capacitors of the bank at discrete rates to compensate for the loss of energy due to loading, the voltage and current across such capacitor bank is stabilized at a substantially uniform value during the pulse energization of the modulator tube load.

Although a specific embodiment of the present invention has been herein shown and described, it is to be understood that still further modifications thereof may be made without departing from the spirit and scope of the appended claims.

I claim:
1. A droop compensating circuit for electronic tube modulator systems comprising energy storage means, a source of high power radio frequency energy for charging said energy storage means, a switching tube interposed in the circuit between said energy storage means and the electronic tube load and operable to control energization of the latter, a source of biasing energy connected to said switching tube and operable to render it normally non-conductive, a constant current droop compensator input source, a second switching tube interposed between said droop compensator input source and said energy storage means and operable to control charging of the latter at a predetermined period of time, a source of biasing energy connected to said second switching tube to render it normally non-conductive, and a trigger input source of pulsed energy simultaneously applicable to both said switching tubes to cause said first mentioned tube to become conductive with attendant discharge of said energy storage means through said electronic tube load to energize the latter for a time period corresponding to the duration of the puse from said trigger input source, and said trigger input source causing said second switching tube to become conductive with attendant simultaneous charging of said energy storage means during the entire pulse period of energization of said electronic tube load to compensate for the droop in the energy of said energy storage means which would otherwise result from the discharge thereof through said load.

2. A droop compensating circuit for electronic tube modulator systems comprising energy storage means, a source of high power radio frequency energy for charging said energy storage means, a switching tube interposed in the circuit between said energy storage means and the electronic tube load and operable to control energization of the latter, a source of biasing energy connected to said switching tube and operable to render it normally non-conductive, a constant current droop compensator input source, a second switching tube interposed between said droop compensator input source and said energy storage means and operable to control charging of the latter at a predetermined period of time, a source of biasing energy connected to said second switching tube to render it normally non-conductive, and a trigger input source of pulsed energy simultaneously applicable to both said switching tubes to cause said first mentioned tube to become conductive with attendant discharge of said energy storage means through said electronic tube load to energize the latter for a time period corresponding to the duration of the pulse from said trigger input source, and said second switching tube being operable upon the application of a pulse of energy from said trigger input source thereto to cause said second switching tube to become conductive with attendant simultaneous charging of said energy storage means in a direction opposite to that of the discharge thereof during the entire pulse period of energization of said electronic tube load, to compensate for the droop in the energy of said energy storage means which would otherwise result from the discharge thereof through said load.

3. A droop compensating circuit for electronic tube modulator systems comprising a bank of capacitors, a source of high power radio frequency energy for charging said capacitor bank, a switching tube interposed in the circuit between said capacitor bank and the electronic tube load and operable to control energization of the latter, a source of biasing energy connected to said switching tube and operable to render it normally non-conductve, a constant current droop compensator input source, a second switching tube interposed between said droop compensator input source and said capacitor bank and operable to control charging of the latter at a predetermined period of time, a source of biasing energy connected to said second switching tube to render it normally non-conductive, and a trigger input source of pulsed energy simultaneously applicable to both said switching tubes to cause said first mentioned tube to become conductive with attendant discharge of said capacitor bank through said electronic tube load to energize the latter for a time period corresponding to the duration of the pulse from said trigger input source, and said trigger input source causing said second switching tube to become conductive with attendant simultaneous charging of said capacitor bank during the entire pulse period of energization of said electronic tube load to compensate for the droop in the energy of said capacitor bank which would otherwise result from the discharge thereof through said load.

4. A droop compensating circuit for electronic tube modulator systems comprising energy storage means, a source of high power radio frequency energy for charging said energy storage means, a switching tube interposed in the circuit between said energy storage means and the electronic tube load and operable to control energization of the latter, a source of biasing energy connected to said switching tube and operable to render it normally non-conductive, a constant current droop compensator input source, a second switching tube interposed between said droop compensator input source and said energy storage means and operable to control charging of the latter at a predetermined period of time, a source of biasing energy connected to said second switching tube to render it normally non-conductive, and a trigger input source of pulsed energy simultaneously applicable to both said switching tubes to cause said first mentioned tube to become conductive with attendant discharge of said energy storage means through said electronic tube load to energize the latter for a time period corresponding to the duration of the pulse from said trigger input source, and said second switching tube being operable upon the application of a pulse of energy from said trigger input source thereto to cause said second switching tube to become conductive with attendant simultaneous charging of said energy storage means at a voltage greater than one half the total discharge voltage and in a direction opposite to that of the discharge thereof during the entire pulse period of energization of said electronic tube load, to compensate for the droop in the energy of said energy storage means which would otherwise result from the discharge thereof through said load.

5. A droop compensating circuit for electronic tube modulator systems comprising a bank of capacitors, a source of high power radio frequency energy for charging said capacitor bank, a switching tube interposed in the circuit between said capacitor bank and the electronc tube load and operable to control energization of the latter, a source of biasing energy connected to said switching tube and operable to render it normally non-conductive, a constant current droop compensator input source, a second switching tube interposed between said droop compensator input source and said capacitor bank and operable to control charging of a portion of said capacitor bank at a predetermined period of time and with a current substantially twice the current supplied to said electronic tube load, a source of biasing energy connected to said second switching tube to render it normally non-conductive, and a trigger input source of pulsed energy simultaneously applicable to both said switching tubes to cause said first mentioned tube to become conductive with attendant discharge of said capacitor bank through said electronic tube load to energize the latter for a time period corresponding to the duration of the pulse from said trigger input source, and said second switching tube being operable upon the application of a pulse of energy from said trigger input source thereto to cause said second switching tube to become conductive with attendant simultaneous charging of said capacitor bank at a voltage greater than one half the total discharge voltage and in a direction opposite to that of the discharge thereof during the entire pulse period of energization of said electronic tube load, to compensate for the droop in the energy of said capacitor bank which would otherwise result from the discharge thereof through said load.

No references cited.